(12) United States Patent
Csato et al.

(10) Patent No.: US 9,255,700 B2
(45) Date of Patent: Feb. 9, 2016

(54) BULB LIGHTING DEVICE AND SYSTEM COMPRISING SUCH DEVICE TO MONITOR PATIENTS IN HOME ENVIRONMENT

(71) Applicant: General Electric Company, Schenectady, NY (US)

(72) Inventors: Peter Csato, Budaors (HU); Akos Erdos, Budaors (HU); Gabor Szabo, Budaors (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 500 days.

(21) Appl. No.: 13/627,284

(22) Filed: Sep. 26, 2012

(65) Prior Publication Data

US 2013/0082598 A1 Apr. 4, 2013

(30) Foreign Application Priority Data

Sep. 30, 2011 (EP) .................................. 11462019

(51) Int. Cl.
*H05B 41/36* (2006.01)
*F21V 23/04* (2006.01)
(Continued)

(52) U.S. Cl.
CPC ............. *F21V 23/0442* (2013.01); *F21K 9/135* (2013.01); *F21S 9/02* (2013.01);
(Continued)

(58) Field of Classification Search
USPC ............. 315/33, 34, 297, 307, 308, 309, 149, 315/158, 159, 250; 362/137, 255, 311.01, 362/311.02, 311.03, 311.05, 311.04, 362/311.06, 311.14, 362, 363, 800
See application file for complete search history.

(56) References Cited

U.S. PATENT DOCUMENTS 4,858,083 A * 8/1989 Wakimoto .................... 362/101
5,442,532 A 8/1995 Boulos et al.
(Continued)

FOREIGN PATENT DOCUMENTS

EP 1881261 A1 1/2008
EP 2045510 A2 4/2009
(Continued)

OTHER PUBLICATIONS

David Saetang, PC PC World, GE Develops LED Light Bulb That Last 17 years, Geek Tech (Apr. 12, 2010), http://www.techhive.com/article/194324/led_light_bulbs.html.
(Continued)

*Primary Examiner* — Douglas W Owens
*Assistant Examiner* — Jianzi Chen
(74) *Attorney, Agent, or Firm* — GE Global Patent Operation; Marc A. Vivenzio

(57) ABSTRACT

A bulb lighting device is provided. The bulb device comprises a base, a driving electronics unit comprising a power supply electrically connected to the base and a battery connected to the power supply through a battery management unit, and a communication unit comprising a communication interface and at least one of a wireless unit and a power line unit, wherein the communication unit is electrically connected to the driving electronics unit. The bulb device further comprises an LED module having LED flight sources in an LED array together with an electric driving LED controller arranged inside an at least partially transparent envelope, wherein the LED module is electrically connected to the driving electronics unit, and a motion detector arranged inside the envelope and electrically connected to the driving electronics unit, wherein an output signal of the motion detector is forwarded outside of the bulb lighting device through the communication unit.

20 Claims, 2 Drawing Sheets

(51) Int. Cl.
*F21S 9/02* (2006.01)
*F21K 99/00* (2010.01)
*H05B 33/08* (2006.01)
*H05B 37/02* (2006.01)
*F21W 131/30* (2006.01)
*F21Y 101/02* (2006.01)
*F21Y 111/00* (2006.01)

(52) U.S. Cl.
CPC ....... *H05B 33/0842* (2013.01); *H05B 37/0227* (2013.01); *H05B 37/0272* (2013.01); *F21W 2131/30* (2013.01); *F21Y 2101/02* (2013.01); *F21Y 2111/005* (2013.01); *Y02B 20/44* (2013.01)

(56) References Cited

U.S. PATENT DOCUMENTS

| | | | |
|---|---|---|---|
| 5,626,417 | A | 5/1997 | McCavit |
| 5,814,945 | A | 9/1998 | Hsu |
| 6,346,705 | B1 | 2/2002 | Lee et al. |
| 6,348,691 | B1 | 2/2002 | Sandell et al. |
| 6,523,978 | B1 | 2/2003 | Huang |
| 6,933,854 | B1 | 8/2005 | Burgess |
| 6,943,687 | B2 | 9/2005 | Lee et al. |
| 7,488,941 | B2 | 2/2009 | Lee et al. |
| 7,520,635 | B2 * | 4/2009 | Wolf et al. ............ 362/276 |
| 7,940,191 | B2 | 5/2011 | Hierzer |
| 2005/0276051 | A1 | 12/2005 | Caudle et al. |
| 2008/0130288 | A1 | 6/2008 | Catalano et al. |
| 2009/0303100 | A1 | 12/2009 | Zemany |
| 2010/0327766 | A1 * | 12/2010 | Recker et al. ............ 315/291 |

FOREIGN PATENT DOCUMENTS

WO 9715907 A1 5/1997
WO 2010111733 A1 10/2010

OTHER PUBLICATIONS

European Search Report and Written Opinion issued in connection with corresponding EP Application No. 11462019.8 dated Feb. 16, 2012.

* cited by examiner

BULB LIGHTING DEVICE AND SYSTEM COMPRISING SUCH DEVICE TO MONITOR PATIENTS IN HOME ENVIRONMENT

CROSS-REFERENCE TO RELATED APPLICATIONS

This application claims foreign priority benefits under 35 U.S.C. §119 to co-pending European Patent Application No. 11462019.8, filed Sep. 30, 2011, which is hereby incorporated by reference in its entirety as part of the present disclosure.

BACKGROUND OF THE INVENTION

Embodiments of the present invention relate generally to a bulb lighting device to monitor patients in a home environment.

Motion sensors are widely used both in public buildings and in private homes. The usage of these sensors is very wide: they can be used to switch on the light, or in security systems. Detecting the movement of elderly people is getting more and more important nowadays. Most people above 65 are living alone at home and in most of the cases they suffer from chronic disease such as Parkinson, Alzheimer or dementia. The highest risk is that they will fall during an everyday activity and there is nobody in the vicinity to help them.

Motion detection in private homes is becoming more and more important. Commercial motion detectors are mainly PIR (Passive Infra-Red) sensors where the radiated heat of the body is detected during motion. Special Fresnel lenses are available for detection at close and far distances and for detection at different heights. One of the main disadvantages of PIR sensors is that they cannot detect stationery objects (e.g. standing person), cannot measure distance, and cannot "look" through even a thin object.

Infrared sensors are widely used, but taking into consideration that in most of the cases a light bulb is covered with an envelope, it makes the passive infrared sensor unusable. Additionally, the heat emitted by the light bulb disturbs the infrared sensor, thus requiring the need of insulation or special alignment. In order to make a device usable in as many conditions as possible, motion detection should be done in the widest range (field of view) as possible. Taking the mentioned heat-disturbance into consideration, it makes the usage of infrared sensor more complicated.

Radar technology is another option to detect motion in a home environment. The radar can "see" through the lamp shield, is not sensitive to radiated heat, can see through thin objects such as curtains etc. and can detect motion in a large field of view.

The term "radar" is generally understood to mean a method by means of which short electromagnetic waves are used to detect distant objects and determine their location and movement. The term RADAR is an acronym for Radio Detection And Ranging.

A complete radar measuring system is comprised of a transmitter with antenna, a transmission path, the reflecting target, a further transmission path (usually identical with the first one), and a receiver with antenna. Two separate antennas may be used, but often just one is used for both transmitting and receiving the radar signal.

Microwaves are generally understood to be electromagnetic waves with frequencies above 2 GHz and wavelengths of less than 15 cm (6 in.). For technical purposes, microwave frequencies are used up to approx. 120 GHz; a limit that will extend upwards as technology advances Far above this limit are to be found the infrared, visible light and ultraviolet ranges.

Microwave frequencies are used intensively for communications and locating purposes. To prevent mutual influence and interference, the use of microwaves is officially regulated. There are, however, also internationally released frequency bands for industrial, scientific and medical purposes (so-called ISM bands). Currently these are the following 4 frequency ranges: 2.45 GHz±50 MHz, 24.125 GHz±125 MHz, 5.8 GHz±75 MHz and 61.25 GHz±250 MHz.

Commonly used radar methods include: CW (Continuous Wave) radar (no distance information), Interferometer radar (disadvantage: the absolute distance information is λ2-periodical), Pulse radar, FMCW (Frequency Modulated Continuous Wave) Reflectometer radar, Combined methods radar and TDR (Time Domain Reflectometry) radar. The basic methods used for radar level measuring equipment are Pulse radar or FMCW radar, sometimes supported by the Interferometer method.

Taking the advantages and disadvantages of the above mentioned methods into consideration, the Pulse radar method meets the present requirements. The principle is very simple: a short electrical pulse or wave package is transmitted, meets the reflector after time $t_1=a/c$ and is received back after a total time $t_2=2a/c$, where a is the distance and c is the velocity of light (which is the same as the propagation speed).

The main two disadvantages of both the PIR and radar techniques are: they need wiring, which makes the mounting of these sensors expensive; and they are highly visible, which can make elderly people feel uncomfortable.

Light devices with motion sensing functionality already exist, but the motion sensing is used to turn on the light in these devices.

There are many motion sensors on the market. Most of them use PIR (Passive Infra-Red) for motion sensing. Wireless motion sensors also exist. Wireless as used in relation to these sensors means that they are powered using batteries. There is no such wireless motion sensor known from the prior art where the motion sensor is concealed in a lighting device. From the outside, the device according to the present subject matter, looks like a general light bulb which promotes concealing motion sensors from view. Using radar as the sensing device is also a possible technology for this device.

There are prior documents where radar is used in combination with other sensors, e.g. US Patent Publication No. 2009/0303100 entitled "Motion detection systems using CW radar in combination with additional sensors". This solution is focusing on reliable motion detection using radar but it is not concealed, or integrated into a light emitting device. It uses wireless technology to transmit a motion signal to a remote station though.

Another group of solutions is focusing on integrating motion sensors into lighting fixtures to switch on light if motion is detected. They all use PIR-based motion detectors: U.S. Pat. No. 5,442,532 entitled "Decorative Lighting Fixture for Motion Detection" or U.S. Pat. No. 5,626,417 entitled "Motion detector assembly for use with a decorative coach lamp" or U.S. Pat. No. 5,814,945 entitled "Lighting fixture control device" or U.S. Pat. No. 6,943,687 entitled "PIR motion detector for a decorative lantern" or U.S. Pat. No. 7,488,941 entitled "Decorative lighting fixture with hidden motion detector". Most of these solutions are also focusing on hiding the motion detector, but none of them are wireless. U.S. Pat. No. 6,346,705 entitled "Hidden PIR motion detector with mirrored optics" is directly focusing on another possible way of hiding the PIR motion detector.

One of the advantages of using radar technology is that its viewing angle is pretty wide. There is a disclosure of U.S. Pat. No. 6,348,691 entitled "Motion detector with extra-wide angle mirrored optics" in which this kind of motion detector is shown, focusing on achieving a 360 degree viewing angle using PIR detector. This document describes how to achieve this target, but it neither is integrated into a device nor uses wireless technology.

Nowadays, many attempts can be seen to integrate new types of lighting devices or any non-conventional lighting methods into a conventional shape light bulb. The reason of the importance of these attempts is that many customers still prefer, conventional pear-shaped light bulbs. U.S. Pat. No. 6,523,978 entitled "Lamp bulb with stretchable lamp beads therein" shows light beads integrated into a convenient light bulb. One of the aspects of this solution is that the light bulb can be disassembled, thus the shape of the light bead can be adjusted.

There are two ways of communication between a sensor and a remote supervision station, and there are different embodiments to fulfill this requirement, which can be categorized into two main groups: wireless and wired.

The main known wireless communication types (in the 2.4 GHz frequency range) are Bluetooth, WiFi and ZigBee. The first two technologies are known to have high power consumption and, considering that it is desirable to detect motion even if the lamp is switched off, the best choice is to use ZigBee technology specially designed for cases where devices periodically "wake up", send short messages and then return to a sleep mode.

The device can be battery-powered if the light is off. In this case we cannot use power line communication; the only way is to use wireless communication, preferably ZigBee technology. It is much more secure and it better meets up-to-date requirements.

The ZigBee technology is briefly summarized in the following.

The ZigBee network consists of one coordinator, full function devices (FFD, also known as routers) and reduced function devices (RFD, also known as end devices). The coordinator is unique on the network and only one instance is allowed in one network. Both the FFD and RFD devices can receive and send signals, but the FFD can have child devices, while the FED is on the bottom level (at the end) of the hierarchy. An important requirement of the FFDs is that they need continuous power supply so, in most of the cases, they are plugged into the wall outlet (power line), and batteries are not allowed.

The network topology can be star, mesh or cluster tree. The ZigBee network is best described, among its topology, by the network channel and the network pan ID. Network channel ranges from channel 11 (2405 MHz) to 26 (2480 MHz) and the panID is a unique 16-bit number. Two networks on the same channel with different panID may exist, but is not recommended if there is a free, noiseless channel available.

Networks may further comprise beacon and non-beacon modes. In non-beacon-enabled networks ZigBee Routers typically have their receivers continuously active, requiring a more robust power supply. However, this allows for heterogeneous networks in which some devices receive continuously, while others only transmit when an external stimulus is detected.

In beacon-enabled networks, the ZigBee Routers transmit periodic beacons to confirm their presence to other network nodes. Nodes may sleep between beacons, thus lowering their duty cycle and extending their battery life. Beacon intervals may range from 15.36 milliseconds (at 250 kbit/s) to 786.432 seconds (at 20 kbit/s). However, low duty cycle operation with long beacon intervals requires precise timing, which can conflict with the need for low product cost.

It can be easily seen that it makes sense to use non-beaconed mode. The ZigBee node at the lamp may receive constantly, since it is connected to the mains supply, while a battery-powered light switch would remain asleep until the switch is thrown. The switch then wakes up, sends a command to the lamp, receives an acknowledgment, and returns to sleep. In such a network, the lamp node will be at least a ZigBee Router, if not the ZigBee Coordinator; the switch node is typically a ZigBee End Device.

Wired communication is typically networked over a power line (known as power line communication or power line networking (PLN)) to avoid having additional wires. One must ensure, however, that the power line is not physically isolated. The following options are available. The device may continuously operate on its supply voltage (i.e. does not need batteries) and the lamp switch only sends an on/off signal. The disadvantage of this method is that it is unsafe because of the continuous high voltage supply. Or, one can use this method without having the device continuously on power supply by ensuring that the connection between the lamp and the coordinator is continuous. The disadvantage of this method is that it cannot be implemented in existing circuits, as a conventional lamp switch physically isolates the switched device.

The Power Line Networking is briefly summarized in the following.

The term Power Line Networking is used in many ways: Power Line Communication or Power Line Carrier (both abbreviated as PLC), Power Line Digital Subscriber Line (PDSL), mains communication, power line telecom (PLT), power line networking (PLN), or Broadband over Power Lines (BPL); but they all mean carrying data on a conductor also used for electric power transmission.

One of the many advantages of Power line Communication is that it can be used at every stage of the voltage transmission, at high voltage transmission lines and lower voltages as well. Care must be taken because transformers typically prevent proper signal propagation. Since the power wiring system was originally intended for transmission of AC power, in conventional use, the power wire circuits have only a limited ability to carry higher frequencies. The propagation problem limits the usage of power line communication.

There is also a term for PLN, Homeplug, and there is also an alliance called the HomePlugPower line Alliance, which is a group of electronics manufacturers, service providers, and retailers that establishes standards for, and tests members' devices for, compliance with the various power line communication technologies known as HomePlug.

The speed of the PLNs is comparable to older, common wireless and wired communication systems: HomePlug 1.0 has a data rate of 14 Mbps, HomePNA 2.0 has a data rate of 10 Mbps, while IEEE802.11b has a data rate of 11 Mbps and IEEE802.11a has a data rate of 55 Mbps. For a complete comparison the ZigBee network has a theoretical data rate of 250 kbit/s.

An important parameter of the communication channel is the signal-to-noise ratio, SNR, wherein SNR=(Received power)/(Noise power). The signal clarity is highly affected by the devices (loading impedances) connected to the transmission line (channel). This is the reason why it is still hard to use PLNs over large distances.

There is a need to provide a bulb lighting device with extended functionalities to monitor patients in a home environment, which has a base as a conventional light bulb, and which is capable of replacing the conventional light bulb used in current lighting apparatuses. It can thus be replaced by a conventional light bulb if needed. There is also a need for the ability to communicate between the device and a remote station with minimal additional technical investments.

BRIEF DESCRIPTION OF THE INVENTION

According to an embodiment of the present invention, a bulb lighting device is provided. The bulb lighting device comprises a base for insertion into a standard lamp socket, a driving electronics unit comprising a power supply electrically connected to the base, the driving electronics unit further comprising a battery connected to the power supply through a battery management unit, and a communication unit. The communication unit comprises a communication interface and at least one of a wireless unit for wireless communication through the air with a wireless remote station, and a power line unit for wired communication through the base and a power line mains network with a wired remote station, wherein the communication unit is electrically connected to the driving electronics unit. The bulb lighting device further comprises an LED module having LED light sources in an LED array together with an electric driving LED controller arranged inside an at least partially transparent envelope, wherein the LED module is electrically connected to the driving electronics unit, and a motion detector arranged inside the envelope and electrically connected to the driving electronics unit, wherein an output signal of the motion detector is forwarded outside of the bulb lighting device through the communication unit.

According to another embodiment of the present invention, a system to monitor patients in a home environment is provided. The system comprises a bulb lighting device comprising: a base for insertion into a standard lamp socket, a driving electronics unit comprising a power supply electrically connected to the base, the driving electronics unit further comprising a battery connected to the power supply through a battery management unit, and a communication. The communication unit comprises a communication interface and at least one of a wireless unit for wireless communication through the air with a wireless remote station, and a power line unit for wired communication through the base and a power line mains network with a wired remote station, wherein the communication unit is electrically connected to the driving electronics unit. The bulb lighting device further comprises an LED module having LED light sources in an LED array together with an electric driving LED controller arranged inside an at least partially transparent envelope, wherein the LED module is electrically connected to the driving electronics unit, and a motion detector arranged inside the envelope and electrically connected to the driving electronics unit, wherein an output signal of the motion detector is forwarded outside of the bulb lighting device through the communication unit. The system further comprises a processing unit connected to the power supply and configured to receive signals from a door opening detector and a lamp on/off switch, wherein at least one of a wireless modem placed within a proximity of the bulb lighting device and a wired modem placed in the electric mains network is connected to the processing unit for transmitting data to or from the bulb lighting device.

BRIEF DESCRIPTION OF THE DRAWINGS

The subject matter will now be described in detail with reference to the accompanying drawings, in which.

DETAILED DESCRIPTION OF THE EXEMPLARY EMBODIMENTS OF THE INVENTION

Figure 1:
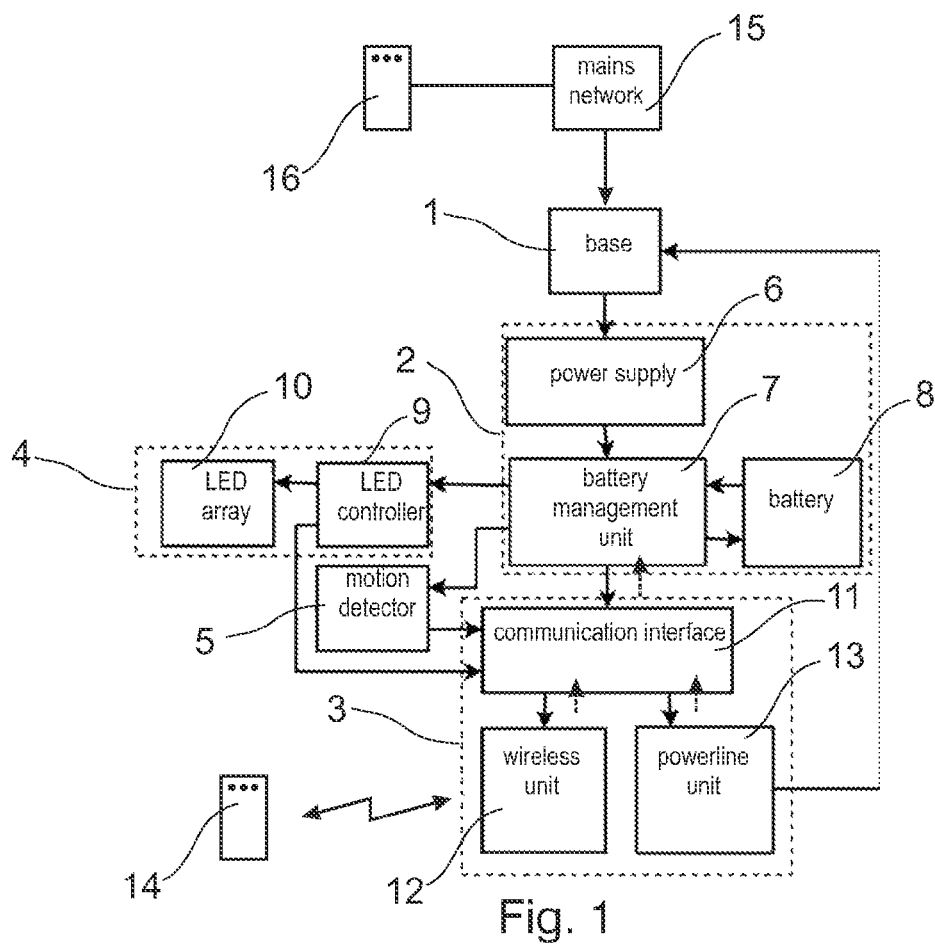
FIG. 1 is a schematic bock diagram of an embodiment of a diagram of the light bulb in accordance with the subject matter described herein.

FIG. 1 shows an embodiment as a functional block diagram that provides an LED light bulb structure with a motion detector. The structure is including a bulb base 1, a connected power module 2, a communication module 3 connected to the power module 2, an LED module 4 connected to the power module 2, and a motion detector 5 also powered by the power module 2 and controlling the communication module 3. In an embodiment illustrated in FIG. 1, the power module 2 comprises a power supply 6 forwarding electrical energy to a battery management unit 7 which is responsible for charging and discharging a built-in battery 8. Charging will be the case in a switched on state of the socket into which the base 1 is inserted, while discharging in order to operate the motion detector 5 and the communication module 3 during a switched off state, when the LED module 4 is not energized. The communication module 3 comprises a communication interface 11 which drives a wireless unit 12 and/or a power line unit 13. In different embodiments, at least one of the wireless unit 12 and the power line unit 13, or alternatively both of them, can be provided. The battery management unit 7 drives the LED module 4 comprising an LED controller 9 and the LED array 10 only during the switched on state. Thus, operation of lighting function and detecting function are independently separated. The motion detector 5 receives electric power permanently since the detecting function is needed substantially continuously. In some alternative embodiments, however, the detecting function may be switched off without removing the base 1 from its socket. This can be achieved, for example, through optional remote power line or wireless controlling.

All of these enumerated functional components are known and commonly used in lighting and communication industries.

Figure 2:
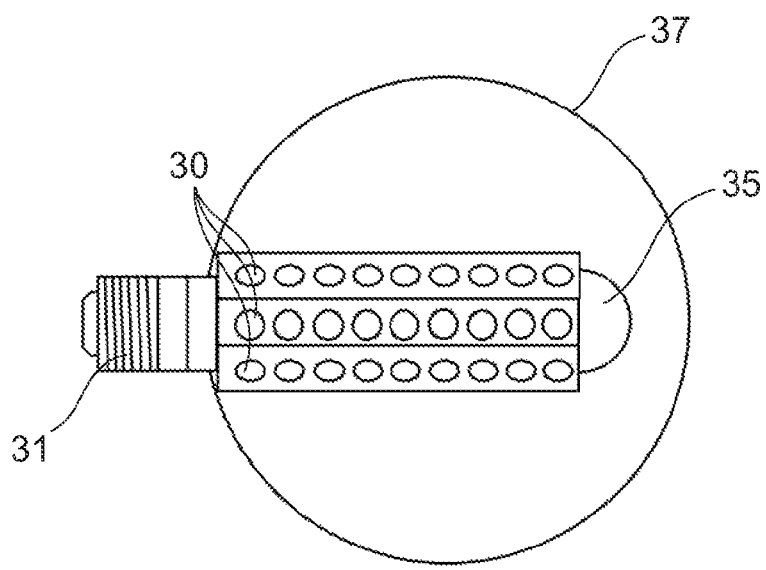
FIG. 2 is an embodiment of the light bulb in side view in accordance with the subject matter described herein.

The bulb lighting device according to an embodiment illustrated in FIG. 2 has an envelope 37 that surrounds the LED array 30 and also the associated circuitry. Although illustrated as having a quasi-spherical shape, the envelope 37 may be alternatively formed in any other shape that provides protection to the LED array 30 and the control circuitry, namely the driving electronics 2, the communication unit 3 and the LED controller 9 (these components not shown in this view) from impact or exposure to ambient conditions (liquids, corrosive materials, salt air, etc.) A motion detector 35 is also included within the envelope 37. The motion detector 35 is positioned to face opposite to the base 31 of the bulb lighting device in this embodiment.

In an embodiment, LED array 30 has plural elongated LED boards as illustrated in FIG. 2. The number of the LEDs along the LED array 30 is an illustration only and it can be adjusted to the actual necessities.

Figure 3:
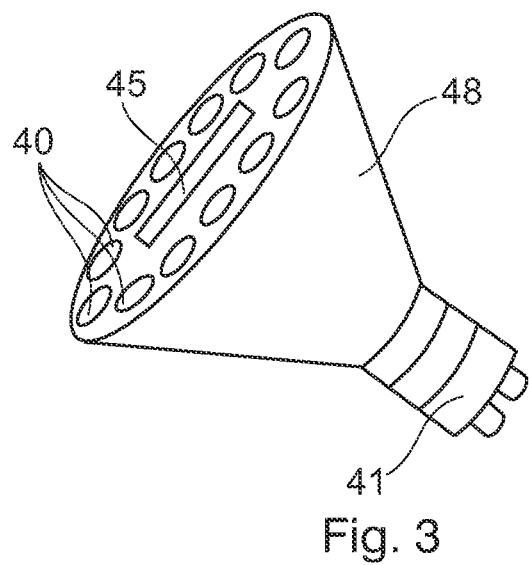
FIG. 3 is an embodiment of the light bulb in side view in accordance with the subject matter described herein.

FIG. 3 shows an alternative design for an envelope 48. The LED array 40 together with the above mentioned circuitry and also a motion detector 45 are arranged inside the at least partially transparent envelope 48. This means that some parts of the envelope 48 may be, in some embodiments, non-transparent, such as, for example, a reflector surface. The envelope 48 in this embodiment is of a conical shape.

It has to be made clear that many other different outer envelope shapes can also be applicable. For example, oval or tubular envelopes can be used it is not necessary to enumerate all of the possible variations.

The base 31, 41 can be of a commonly used Edison type, but any other type may also be applied. The envelope 37, 48 and the base 31, 41 are integrally joined together to form a closed protective housing for the internal elements of the bulb. Although a tight fit between the envelope 37, 48 and the base 31, 41 is useful to protect the internal elements of the bulb from ambient conditions. A vacuum seal, as is required in incandescent lamps, is not necessary here.

The power line unit 13 and the wireless unit 12 indicated in FIG. 1 can receive/transmit signals. For example, the power line unit 13 and the wireless unit 12 can receive on/off and dimming (brightness control) signals, transmit motion signal, battery control signal, etc. LED arrays 10 are dimmed according to the signal received using the PWM (Pulse Width Modulation) signal of the LED controller 9.

One of the main roles of the communication interface 11 is to switch between wired and wireless modes in an embodiment where both the power line unit 13 and the wireless unit 12 are included in the bulb lighting device. Signals are generally transmitted using wireless connection, but a "sniffing" of the wireless frequency band is regularly done to determine the wireless channel with the least traffic and noise. If there is no such wireless channel available, the communication interface 11 switches to the wired mode. Another task for the communication interface 11 is to handle messages arriving in the wireless and wired mode in parallel and to filter out possible collisions.

All parts of the circuitry are connected to driving electronics 2 in order to provide power. This unit distributes power to the different parts and manages charging/discharging of the battery 8 which is connected to the battery management unit 7 directly. It receives current during charging and transmits supply voltage in a battery operated mode.

The LEDs along the LED array 10 can be grouped. This embodiment is useful when using the bulb lighting device in a decreased brightness mode and as guard light during night because no PWM signal is required for lowering the lighting.

The motion detector 5 can be realized as a PER or radar sensor.

Figure 4:
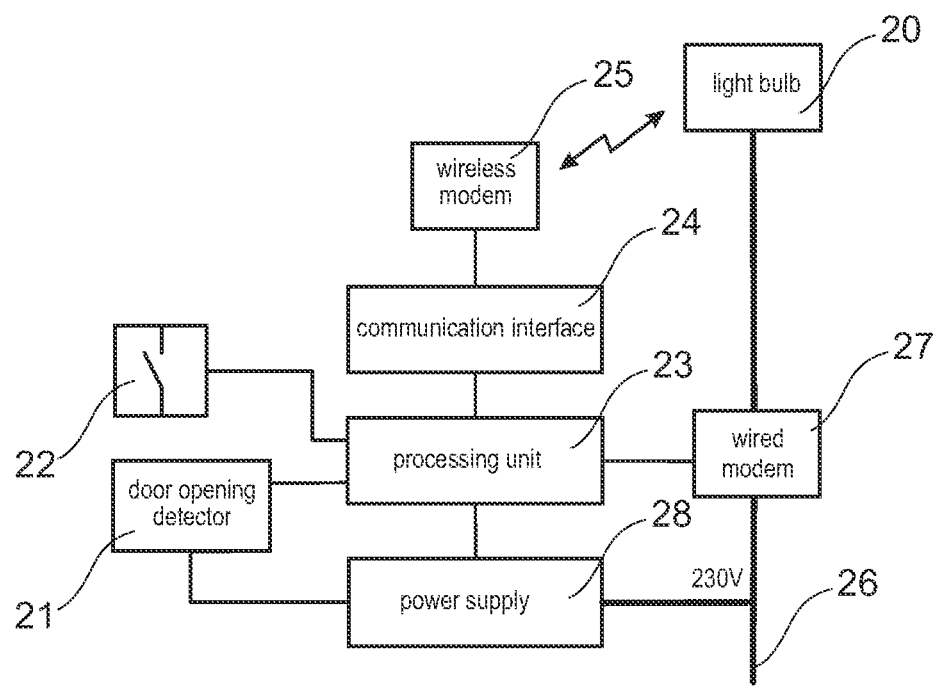
FIG. 4 is a schematic bock diagram of an embodiment of a light bulb built in a system for home health care in accordance with the subject matter described herein.

FIG. 4 shows an example of how a bulb lighting device 20, as described above, could be integrated into a system to monitor patients in a home environment. In addition to the bulb lighting device 20, the system further comprises a door opening detector 21 and a lamp on/off switch 22. The power supply 28 can provide continuous electric power for a processing unit 23 which receives the signals from the door opening detector 21 and a lamp on/off switch 22. The processing unit 23 transmits the corresponding control signals in a wireless or a wired manner. The wireless modem 25 is connected to the processing unit 23 through a communication interface 24 for transmitting data to the bulb lighting device 20 and being placed within proximity of the bulb lighting device 20. Said proximity depends on the circumstances. The proximity in free air could be, for example, up to 30 meters. The wired modem 27 is placed in the electric power line mains network 26 also for transmitting data to the bulb lighting device 20. One of the wireless and wired communication facilities can be eliminated in an embodiment, however both can also be used in the same system.

The wireless modem 25 in an embodiment is a ZigBee router.

The on/off switch 22 that may also send a dimming signal for the bulb lighting device 20 is located near a door of the home environment in most of the cases. Thus it can be equipped with a small, regular PIR (Passive Infra-Red) motion sensor as it has a very good view on the person entering or leaving the room. Such motion sensor can be integrated into the system either in battery operated or mains voltage powered form. This embodiment, combined with a door opening detector 21, can be used to optimize operation of the assigned bulb lighting device 20 by switching the motion detector 5 of FIG. 1 off if the bulb lighting device 20 is in battery operated mode or the light is switched off while there is nobody in the room.

One of the main tasks of the communication interface 24 is not only to detect motion, but to send this motion signal to a central unit.

Taking the already mentioned methods from both wired and wireless points of view into consideration one can use a hybrid technology: the bulb lighting device 20 will transmit the motion signal using Power Line Networking through mains network 26 if it is switched on and will transmit the signal using ZigBee technology, in the wireless modem 25, if it is turned off.

Even if the bulb lighting device is continuously on power line voltage, a battery 8 (see FIG. 1) is needed to prevent ZigBee network collapse in case of a power outage. As mentioned earlier, the battery will be charged if the light is switched on. Even a small capacity battery 8 is enough to ensure that the motion signals will securely deliver to the coordinator even if the light is switched off.

The capacity of the built-in battery 8 can even be enough to have the bulb lighting device act as a guide lamp. The current flowing through a small number (1-3) of LEDs is small enough to let the battery not become fully discharged until early morning in this case, it shall ensure that the lamp is periodically switched on to prevent the battery 8 from getting, fully discharged.

The bulb lighting device 20 can be properly used in a ZigBee network if it is functioning as a ZigBee router as it is supposed to be continuously connected to the mains voltage. Such a router can be used when integrating into larger ZigBee networks having a large number of devices. The main role of the router is to strengthen the wireless signal which is required if the signal is too weak for a direct coordinator-device connection. Additionally the light bulb or lamp sockets, armatures are generally located in the middle of the ceiling in a room, which is the best position for strengthening the signal for the ZigBee devices inside the room.

The device described in the preceding disclosure is provided with the functionality of a motion sensor that does not need extra wiring, its installation is convenient and the device itself is almost "invisible" to the resident. A motion detector is integrated into a device that exists in each and every room inside an apartment or flat. One embodiment of these devices is a light bulb, which is already provided with some of the features needed for a motion sensor, such as power wires and mounting points. Embodiments of the present invention provide a device which is easy to change and install similarly to those of conventional light bulbs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bulb lighting device comprising:
   a base for insertion into a standard lamp socket;
   a driving electronics unit comprising a power supply electrically connected to the base, the driving electronics unit further comprising a battery connected to the power supply through a battery management unit;
   a communication unit comprising a communication interface and at least one of a wireless unit for wireless communication with a wireless remote station, and a power line unit for wired communication through the base and a power line mains network with a wired remote station, wherein the communication unit is electrically connected to the driving electronics unit,
   an LED module having LED light sources in an LED array together with an electric driving LED controller arranged inside an at least partially transparent envelope, wherein the LED module is electrically connected to the driving electronics unit; and
   a motion detector arranged inside the envelope and electrically connected to the driving electronics unit, wherein an output signal of the motion detector is forwarded outside of the bulb lighting device through the communication unit using the power line unit when the LED module is ON, and using the wireless unit when the LED module is OFF.

2. The bulb lighting device according to claim 1, wherein the motion detector is a PIR sensor.

3. The bulb lighting device according to claim 1, wherein the motion detector is a radar sensor.

4. The bulb lighting device according to claim 1, wherein the communication unit comprises both a wireless unit and a power line unit.

5. The bulb lighting device according to claim 4, wherein the communication interface is configured to switch between a wired communication mode and a wireless communication mode in response to detection of an existing wireless channel.

6. The bulb lighting device according to claim 1, wherein the driving electronics unit is configured to dim the LED array by PWM signal driving.

7. The bulb lighting device according to claim 6, wherein the driving electronics unit is controlled by dimming signals received by the communication unit from at least one of the remote stations.

8. The bulb lighting device according to claim 1, wherein the battery management unit is configured to manage charging and discharging of the battery.

9. The bulb lighting device according to claim 1, wherein the base is of an Edison type.

10. The bulb lighting device according to claim 1, wherein the driving electronics unit receives an external control signal through at least one of the wireless unit and the power line unit.

11. The bulb lighting device according to claim 10, wherein the external control signal is a transmitted signal of a door opening detector.

12. The bulb lighting device according to claim 1, wherein the LED module is connected to a first power output of the battery management unit providing switched electric power, and wherein the motion detector and the communication unit are electrically connected to a second power output of the battery management unit providing continuous electric power.

13. The bulb lighting device according to claim 1, where the envelope is a conical shape.

14. The bulb lighting device according to claim 1, where the envelope is of a quasi-spherical shape.

15. A system to monitor patients in a home environment comprising:
   a bulb lighting device comprising:
      a base for insertion into a standard lamp socket;
      a driving electronics unit comprising a power supply electrically connected to the base, the driving electronics unit further comprising a battery connected to the power supply through a battery management unit;
      a communication unit comprising a communication interface and at least one of a wireless unit for wireless communication through the air with a wireless remote station, and a power line unit for wired communication through the base and a power line mains network with a wired remote station, wherein the communication unit is electrically connected to the driving electronics unit;
      an LED module having LED light sources in an LED array together with an electric driving LED controller arranged inside an at least partially transparent envelope, wherein the LED module is electrically connected to the driving electronics unit; and
      a motion detector arranged inside the envelope and electrically connected to the driving electronics unit, wherein an output signal of the motion detector is forwarded outside of the bulb lighting device through the communication unit; and
   a processing unit connected to the power supply and configured to receive signals from a door opening detector and a lamp on/off switch, wherein at least one of a wireless modem placed within a proximity of the bulb lighting device, and a wired modem placed in the electric mains network is connected to the processing unit for transmitting data to or from the bulb lighting device.

16. A bulb lighting device comprising:
   a base for insertion into a standard lamp socket;
   a driving electronics unit comprising a power supply electrically connected to the base, the driving electronics unit further comprising a battery connected to the power supply through a battery management unit;
   a communication unit comprising a communication interface and at least one of a wireless unit for wireless communication through the air with a wireless remote station, and a power line unit for wired communication through the base and a power line mains network with a wired remote station, wherein the communication unit is electrically connected to the driving electronics unit,
   an LED module having LED light sources in an LED array together with an electric driving LED controller arranged inside an at least partially transparent envelope, wherein the LED module is electrically connected to the driving electronics unit;
   a motion detector arranged inside the envelope and electrically connected to the driving electronics unit, wherein an output signal of the motion detector is forwarded outside of the bulb lighting device through the communication unit; and
   wherein the LED module is connected to a first power output of the battery management unit providing switched electric power, and wherein the motion detector and the communication unit are electrically connected to a second power output of the battery management unit providing continuous electric power.

17. The bulb lighting device according to claim 16, wherein the driving electronics unit is configured to dim the LED array by PWM signal driving.

18. The bulb lighting device according to claim 17, wherein the driving electronics unit is controlled by dimming signals received by the communication unit from at least one of the remote stations.

19. The bulb lighting device according to claim 17, wherein the driving electronics unit receives an external control signal through at least one of the wireless unit and the power line unit.

20. The bulb lighting device according to claim 19, wherein the external control signal is a transmitted signal of a door opening detector.

\* \* \* \* \*